US006879674B2

(12) United States Patent
Strandberg

(10) Patent No.: US 6,879,674 B2
(45) Date of Patent: Apr. 12, 2005

(54) SYSTEM AND METHOD FOR PROVIDING AN AUTOMATIC TELEPHONE CALL BACK TO A TELEPHONE LINE BEING USED TO ACCESS A COMPUTER NETWORK

(75) Inventor: Malcom B. Strandberg, Cambridge, MA (US)

(73) Assignee: CIM Ltd. (KY)

( * ) Notice: Subject to any disclaimer, the term of this patent is extended or adjusted under 35 U.S.C. 154(b) by 0 days.

(21) Appl. No.: 09/057,749

(22) Filed: Apr. 9, 1998

(65) Prior Publication Data

US 2002/0141557 A1 Oct. 3, 2002

(51) Int. Cl.[7] .......................... H04M 3/42; H04M 3/00; H04M 5/00
(52) U.S. Cl. ............................. 379/210.01; 379/266.07
(58) Field of Search ....................... 379/265.01–266.1, 379/309, 209.01, 201.01, 207.02, 215.01, 210.01; 370/351, 352, 259, 270

(56) References Cited

U.S. PATENT DOCUMENTS

| | | | |
|---|---|---|---|
| 4,052,570 A | | 10/1977 | Sutton ........................... 179/90 |
| 4,065,642 A | | 12/1977 | McClure ........................ 179/18 |
| 4,143,243 A | | 3/1979 | Sutton ........................... 179/90 |
| 4,166,929 A | * | 9/1979 | Sheinbein ..................... 379/209 |
| 4,748,511 A | * | 5/1988 | Nichols et al. ............... 358/433 |
| 4,764,949 A | | 8/1988 | Faith et al. ...................... 379/9 |
| 4,881,261 A | | 11/1989 | Oliphant et al. ............. 379/215 |
| 5,185,782 A | * | 2/1993 | Srinivasan .................... 379/214 |
| 5,214,688 A | | 5/1993 | Szlam et al. ................... 379/67 |
| 5,247,569 A | | 9/1993 | Cave ........................... 379/113 |
| 5,436,965 A | * | 7/1995 | Grossman et al. ........... 379/266 |
| 5,590,183 A | * | 12/1996 | Yoneda et al. ............... 379/142 |
| 5,592,538 A | | 1/1997 | Kosowsky et al. ........... 379/93 |
| 5,594,791 A | | 1/1997 | Szlam et al. ................. 379/265 |
| 5,710,803 A | | 1/1998 | Kowal et al. .................. 379/41 |
| 5,742,674 A | * | 4/1998 | Jain et al. .................... 379/209 |
| 5,802,161 A | * | 9/1998 | Svoronos et al. ........... 379/216 |
| 5,809,128 A | * | 9/1998 | McMullin .................... 379/215 |
| 5,822,400 A | * | 10/1998 | Smith .......................... 379/265 |
| 5,828,731 A | * | 10/1998 | Szlam et al. ................. 379/265 |
| 5,838,682 A | * | 11/1998 | Dekelbaum et al. ........ 370/401 |
| 5,884,032 A | * | 3/1999 | Bateman et al. ............. 379/265 |
| 5,903,642 A | * | 5/1999 | Schwartz et al. ........... 379/309 |
| 5,914,951 A | * | 6/1999 | Bentley et al. .............. 379/285 |
| 5,946,386 A | | 8/1999 | Rogers et al. ............... 379/265 |
| 5,956,393 A | | 9/1999 | Tessler et al. ............... 379/197 |
| 5,991,394 A | | 11/1999 | Dezonno et al. ............ 379/265 |
| 6,134,530 A | | 10/2000 | Bunting et al. ................ 705/7 |
| 6,282,284 B1 | * | 8/2001 | Dezonno et al. ....... 379/265.09 |

* cited by examiner

Primary Examiner—Benny Tieu
(74) Attorney, Agent, or Firm—Bourque & Assoc., PA

(57) ABSTRACT

A system and method provides an automatic telephone call back to a telephone line being used to access a computer network. A call back is made in response to a request by an inquiring party at a remote data terminal connected to the computer network using a telephone line. The inquiring party provides call back data at the data terminal connected to a computer network, such as the Internet, by way of a telephone line. The call back data is transferred over the computer network to the automated telephone call back system. A computer network interface at the automated back system provides a gateway between the computer network and an automated dialer system. The automated dialer system retrieves telephone numbers provided by the inquiring parties, schedules the call backs, and automatically dials the telephone numbers using a predictive dialer. If a telephone number is scheduled for an immediate call back, the call status is monitored by the dialer to detect a busy signal. If a busy signal is detected, a redial script instructs the predictive dialer to continuously redial the number until an answer is detected, i.e., the inquiring party disconnects from the computer network and the telephone line becomes available. If a connection is made, the dialer will automatically connect the called party to an available agent, and any additional information about the called party, if available, will be transmitted to the agent's terminal by the call back manager.

11 Claims, 3 Drawing Sheets

SYSTEM AND METHOD FOR PROVIDING AN AUTOMATIC TELEPHONE CALL BACK TO A TELEPHONE LINE BEING USED TO ACCESS A COMPUTER NETWORK

FIELD OF THE INVENTION

The present invention relates to telephony systems and more particularly, to a system and method for providing an automatic telephone call back to a telephone line being used to access a computer network.

BACKGROUND OF THE INVENTION

Telephony call centers which place outbound calls and receive inbound calls (often called call campaigns) typically utilize a telephone call center management system to help automate much of the process. The telephone call center management system controls, among other functions, the dialing of outbound telephone numbers from a predefined, sorted call list having a number of customer call records within each call list. These customer call lists may be downloaded from a call record source, such as a host computer, to the telephone call center management system once during a 24 hour period, often during the non-busy early hours of the morning, or may be continuously and dynamically downloaded for dynamic updating of call records within a call list. The telephone call center management system automatically connects outbound calls and inbound calls to available operators or agents for handling.

In the past, the overwhelming majority of customers or potential customers (collectively "inquiring parties") contacted the call center by telephone to obtain information. These inquiring parties may be calling for many different reasons. For example, the inquiring parties may want information on the company's products or services, or may want information on their existing account with the company. Often there are no agents available at the company to provide the requested information, and the inquiring party must wait on hold for an available agent, receive the information by way of recorded messages, or call back at another time.

With the advent of global or large scale computer networks such as the Internet (also known as the World Wide Web), it is now possible for companies to provide information "on-line" that is accessible by its customers or potential customers via a data terminal (e.g. a PC) connected to the network. A company may provide "on-line" information about products and/or services that might be of interest to an inquiring party, as well as information on the status of a party's account. One way of providing on-line information is with hypertext documents on the World Wide Web created using Hypertext Markup Language (HTML). By browsing through these "web pages" using the data terminal, the inquiring party can obtain information in the form of text, graphics and/or sound.

Although the Internet or other such computer network provides an additional medium for communicating information to inquiring parties, a party may still want assistance from a "live" agent. Some "web pages" allow inquiring parties to request a call back by including a field for the inquiring party to provide a telephone number or other such information related to contacting the party with a "live" agent. These requests are typically transmitted to the company, for example, in the form of electronic mail and stored in a file. The telephone numbers and other relevant information are then manually entered into an existing telephone call center management system. The call back is then made at a later, less convenient time using the existing telephony system, e.g., by having an agent manually call back or by automatically calling back and placing the party on hold to wait for an available agent. If the inquiring party needs assistance, e.g., with an account, a product/service, or the like, the existing systems are unable to provide that assistance at the time requested by the inquiring party.

An immediate call back is often the ideal time for responding to a request by the inquiring party. The inquiring party is interested in this particular product, service, or information at the moment the request is made and is likely to be proximate to a telephone. Providing an immediate connection to an agent, however, presents an additional problem. One common way to connect to the Internet/World Wide Web is by using a PC with a modem that dials in to an Internet Service Provider (ISP) over the Public Switched Telephone Network (PSTN). If the only available telephone line is being used for connecting to the network, an immediate call back may not be possible since the inquiring party is likely to still be connected to the network (i.e., "on-line") when the attempted call back is made. When dialing outbound calls, existing telephony systems will typically treat a busy signal as a failed attempt and will schedule a recall at a later point in time. Thus, the inquiring party will not receive the assistance as soon as possible after the request has been made.

As the usage of the Internet and other global computer networks increases, an increasing number of individuals will want to use this medium of communication to contact companies for requesting information. Existing telephone call center management systems are not integrated with global computer networks in a manner that allows a company to automatically and efficiently respond to requests made over the global computer network by inquiring parties with call backs at the most convenient time.

Accordingly, what is needed is an system and method for providing an automatic and immediate telephone call back to an inquiring party who has provided information to a company from a data terminal connected across a computer network. What is also needed is an automatic call back system and method capable of connecting to the inquiring party even if the inquiring party is using the only available telephone line to access the computer network.

SUMMARY OF THE INVENTION

The present invention features a system and method for providing a telephone call back to a telephone line that is being used to access a computer network. The call back is made based upon a request transmitted over the computer network from a data terminal located at a remote location and connected to the computer network using the telephone line. The request includes call back data including at least a telephone number to be called.

The system comprises; a computer network interface, connected to the computer network, for interfacing with the computer network and receiving the request over the computer network, for identifying the call back data, and for storing the call back data including the telephone number in a call back file; and an automated dialer system, responsive to the call back file. The automated dialer system includes a call back campaign manager, for retrieving the telephone numbers in the call back file; a call scheduler, responsive to the call back campaign manager, for scheduling at least one of the telephone numbers for immediate dialing; a predictive dialer, responsive to the ordered telephone numbers, for initiating dialing of each of the ordered telephone numbers as scheduled over telephone lines, for monitoring a status of the telephone lines, and for connecting an answered call to a telephone of an available agent coupled to the automated dialer system; and a re-dial script, responsive to the call back campaign manager, for directing the predictive dialer to redial a busy telephone number when the predictive dialer detects a busy signal after dialing the busy telephone number.

The method comprises the steps of: receiving the request transmitted from the terminal at the remote location; identifying the call back data including at least one telephone number to be dialed; placing the call back data into a call back file; retrieving telephone numbers to be dialed from the call back file; scheduling at least one of the telephone numbers for immediate dialing; automatically dialing the telephone number scheduled for immediate dialing over a telephone line; monitoring the telephone line to detect a busy signal; and redialing the telephone number when the busy signal is detected.

The preferred method continuously redials the busy telephone numbers until an answer is detected. When an answer is detected, the method connects the telephone line to an available agent. If no connection is made, the method adds the unanswered telephone numbers to a further call campaign.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
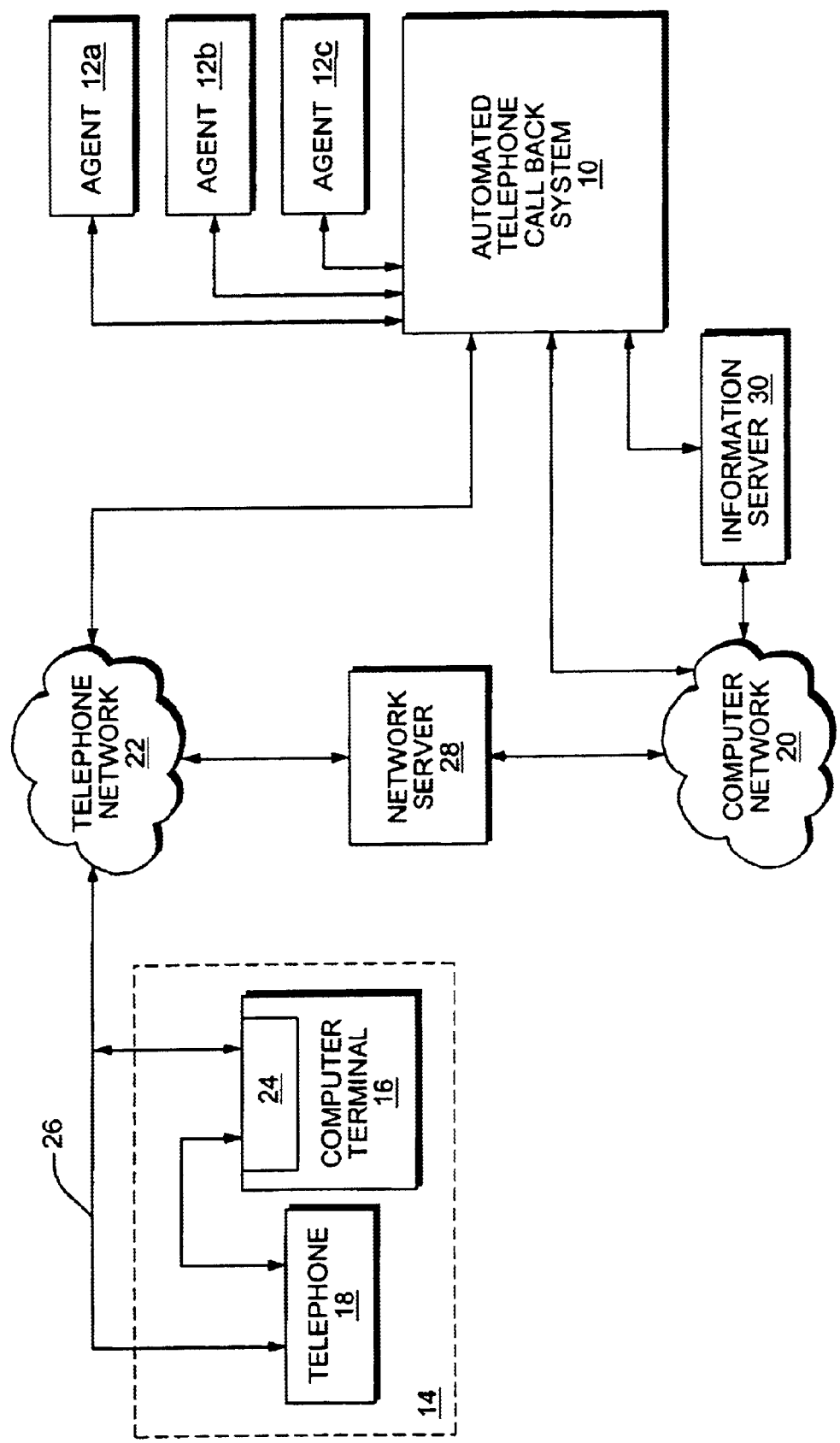
FIG. 1 is a schematic block diagram of an automated telephone call back system used with the global computer network and telephone network, according to the present invention.

The automated telephone call back system 10, FIG. 1, according to the present invention, provides an automatic telephone call back to an inquiring party (e.g. a customer or potential customer) who has requested assistance from a "live" agent 12a–12c at a call center in a company or other organization. The request is typically made from a remote location 14 by way of a terminal 16, such as a PC, connected to a computer network 20, such as the Internet/World Wide Web. The remote location 14 also typically includes a telephone 18 for receiving the call back, as will be described in greater detail below.

In the exemplary embodiment, the terminal 16 at the remote location 14 is connected to the computer network 20 (e.g., the Internet/World Wide Web) using a telephone network 22. To establish the connection to the computer network 20 using the telephone network 22, the computer terminal 16 at the remote location 14, such as the inquiring party's residence, uses a modem 24 connected to a telephone line 26 into the telephone network 22. The modem 24 can be connected directly to the telephone line 26 or can be connected through the telephone 18 at the location 14. The computer terminal 16 accesses the computer network 20 by using the modem 24 to dial in to a computer network server 28, for example, an internet server maintained by an Internet Service Provider (ISP), which provides an interface between the telephone network 22 and the computer network 20. The present invention contemplates other types of "dial-up" connections to the computer network using, for example, Integrated Services Digital Network (ISDN), a cellular telephone network, or other alternatives to conventional telephone connections.

For a "dial up" type connection, the same telephone line 26 is often used by both the telephone 18 to receive calls and the computer terminal 16 to access the computer network 20. Thus, the telephone line 26 may not be available for a call back to the telephone 18 if the telephone line 26 is still in use to access the computer network 20. The present invention provides a system and method for connecting to the telephone 18 over the telephone line 26 when the same telephone line 26 is used both for the telephone 18 and the terminal 16, as will be described in greater detail below.

The inquiring party typically makes the request after making an initial inquiry for information, such as product/service or customer account information. This information is typically provided by an information server 30 accessed by the inquiring party at the remote location 14 by way of the terminal 16 connected to the computer network 20. The request data is transmitted over the computer network 20 to the automated telephone call back system 10 either directly or by way of the information server 30. The automated telephone call back system 10 processes the request and schedules a call back immediately following the request or at a preferred time specified by the inquiring party.

In the exemplary embodiment, the computer network 20 is the Internet/World Wide Web, although the present invention contemplates other types of computer networks that are accessed by "dial up" connections over the telephone line 26. In the exemplary embodiment, the information server 30 is a web server that presents the information in the form of "web pages" including on-line forms for entry of data pertaining to the request (e.g., telephone number, name, account number). In this example, the information server 30 includes a computer that generates hypertext documents using Hypertext Markup Language (HTML) containing the information to be accessed by the inquiring party. The computer terminal 16 is used by the inquiring party to access the information and includes a user interface to display the hypertext documents or "web pages" provided by the information server 20 in the form of text, graphics, pictures, audio, and data (text) entry fields.

If assistance is needed from a live agent, a document is provided by the information server 30 that includes a data entry form requesting the data necessary to make a call back for assistance, e.g. name, telephone number, address, account number, a type of product/service, and the like. The data is then transmitted from the computer terminal 16 to the automated telephone call back system 10 over the computer network 20. The creation of data entry fields and the transmission of the entered data to the automated telephone call back system can be performed by a Common Gateway Interface (CGI) script that runs on the server 30 or a JAVA language program that runs on the computer terminal 16. The automated call back system 10 processes the request, and based upon the request data, a call back can be made to the telephone 18 at the location 14 or any other telephone number specified by the inquiring party. In addition to computer terminal 16, the present invention contemplates other devices capable of receiving and transmitting information over the Internet/World Wide Web or other computer networks.

Figure 2:
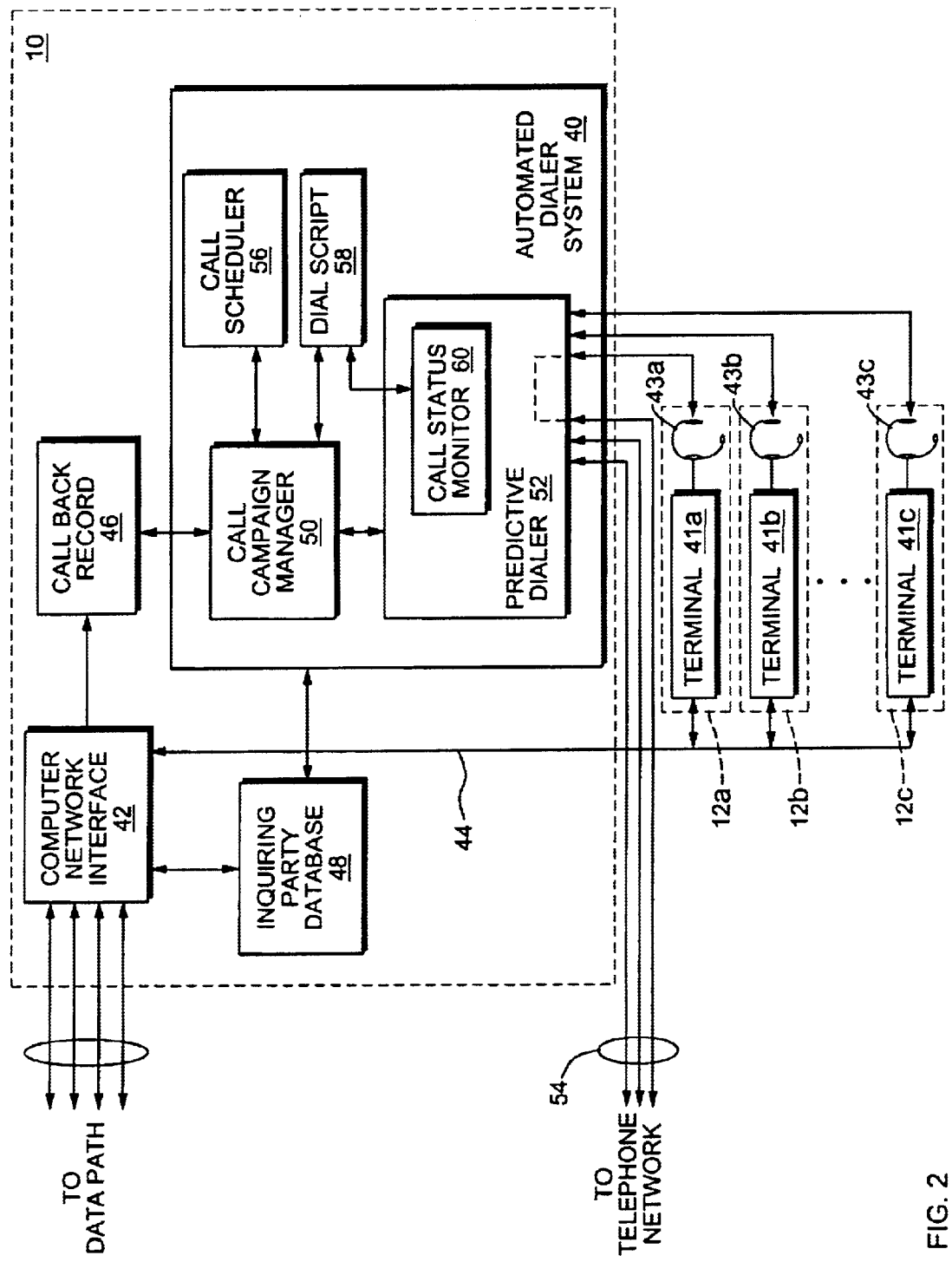
FIG. 2 is a schematic block diagram of the automated telephone call back system, according the present invention.

According to the preferred embodiment, the automated telephone call back system 10, FIG. 2, includes an automated dialer system 40, for processing outbound call campaigns, and a computer network interface 42, for providing an interface or gateway between the automated dialer system 40 and the computer network 20 over which the call back request is made. According to one example, the automated dialer system 40 is implemented as part of a telephony system, such as the type sold under the name UNISON® by Davox Corporation, Westford, Mass. This type of telephony system is disclosed in greater detail in U.S. Pat. No. 5,592,543 issued Jan. 7, 1997, assigned to the assignee of the present application and incorporated herein by reference. In the telephony system, the agents 12a–12c each have a headset 43a–43c or other voice processing device and a computer terminal 41a–41c or other type of data input/output device connected to the automated dialer system 10. The computer network interface 42, the automated dialer system 40, the agent terminals 41a–41c, and other components of the system 10 are connected with a data path 44, such as an ethernet network.

The computer network interface 42 receives the call back data and other inquiring party data transmitted over the computer network 20, creates a call back record 46 and routes the call back record 46 (e.g., telephone number, and time to call) to a call manager. The call back records 46 can be dynamically created and sent to the call campaign manager 50 as call back requests are received by the computer network interface 42. One example of a system that dynamically updates call records in a call list is disclosed in greater detail in U.S. patent application Ser. No. 08/635,028 filed Apr. 19, 1996, assigned to the assignee of the present invention and incorporated herein by reference. Other data pertaining to the inquiring party (e.g., name, address, account number, products/services of interest), may be stored in an inquiring party database 48. If the inquiring party has been previously contacted (e.g., an existing customer), additional data may be downloaded to the inquiring party database 48 from a host (not shown) coupled to the automated dialer system 40.

The automated dialer system 40 then processes the call records 46 as an outgoing telephone call campaign. The call campaign manager 50 manages the outbound dialing of the telephone numbers in the call back records 46. The automated dialer system 40 also includes a predictive dialer 52 that automatically dials the telephone numbers within the call records 46 over one of the telephone (trunk) lines 54. When an answer is detected, the call is connected to a headset 43a–43c of the available agent, and information pertaining to the called party can be routed by the automated dialer system 40 from the inquiring party database 48 to the terminal 41a–41c of the available agent.

In the preferred embodiment, the automated dialer system 40 further includes a call scheduler 56, responsive to the call campaign manager 50, for determining the optimum time to call each of the numbers and for arranging the call records 46 accordingly. One type of call scheduler 56 is typically implemented as a software program and is described in greater detail in U.S. patent application Ser. No. 08/699,292 entitled "Call Record Scheduling System And Method" assigned to the assignee of the present invention and incorporated herein by reference. The call scheduler 56 will prioritize the call records based upon call back data specified by the inquiring party. If immediate call back is requested or if no call back time is specified, the call records are repeatedly called upon until no longer busy since the inquiring party is likely to be proximate to the telephone.

The automated dialer system 40 also includes a dial script 58, responsive to the call campaign manager 50, for controlling the dialing of the telephone numbers in the call file 46 when a busy signal is received. The dial script 58, also referred to as a telephony application client (TAC), is typically implemented as a software program. Examples of TACs used in outbound dialing are disclosed in U.S. patent application Ser. No. 08/252,338 entitled "Universal Telephony Application Client", assigned to the assignee of the present application and incorporated herein by reference. The call campaign manager 50 initiates the dial script 58 when the call scheduler 56 schedules call backs for immediate dialing.

The predictive dialer 52 preferably includes a call status monitor 60 that monitors the status of the call progress signals on the telephone lines 54. The dial script 58 is responsive to the call status monitor 60, and when a busy signal is detected by the call status monitor 60, the dial script 58 directs the predictive dialer 52 to immediately (or within a short period such as one minute) re-dial the busy telephone number. The dial script 58 thus causes immediate call backs to be continuously re-dialed when a busy signal is detected, allowing a call back to be made as soon as possible after a party disconnects from the computer network 20

The predictive dialer 52 preferably utilizes a call pacing algorithm which is designed to optimize the time utilization by the telephone call agents. A description of one type of predictive dialer and call pacing algorithm is disclosed in U.S. Pat. No. 5,295,184 assigned to the assignee of the present application and incorporated herein by reference. The predictive dialer 52 controls the automatic dialing of the call back numbers as well as the dialing of numbers in other active outbound campaigns to minimize the amount of time a called party will have to spend on hold.

Figure 3:
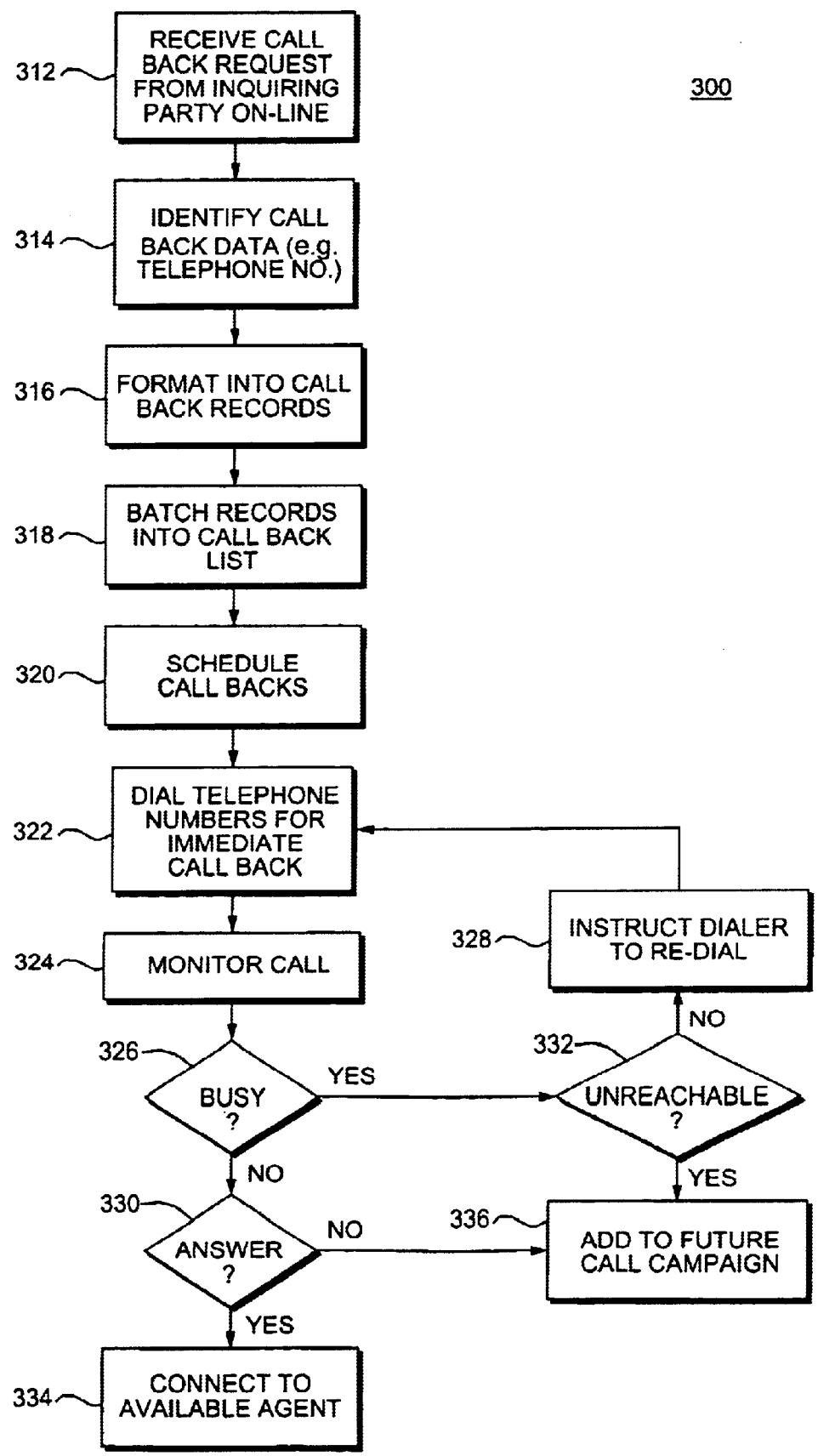
FIG. 3 is a flow chart illustrating the method of providing an automatic call back, according to the present invention.

The automatic telephone call back method 300, FIG. 3, according to the present invention, begins when the computer network interface 42 of the automated telephone call back system 40 receives a request for assistance from an agent, step 312. The call back data (e.g., the telephone numbers to be dialed and call back time) is identified by the computer network interface 42, step 314, and formatted into call back records 46, step 316. The call back records 46 are sent to the automated dialer system 40 and are batched into a call back list, step 318, and, based upon other call back data transmitted by the inquiring party, determines the most convenient time for a call back and schedules the call backs accordingly, step 320. Unless the inquiring party specifies a different time, an immediate call back will be scheduled, since the inquiring party is likely to be proximate the telephone.

The telephone numbers scheduled for immediate call back are then immediately and automatically dialed, step 322. The telephone lines 54 over which the call is being made are monitored to determine whether a connection is made, step 324. If a busy signal is detected, step 326, the dial script 58 instructs the dialer 52 to re-dial the number, step 328. The dialer 52 continuously re-dials the number, until an answer is detected, step 330, or until a determination is made that callee is no longer there (ring no answer, or answer machine detected), step 332, and the call is aborted or rescheduled for later or the end of campaign is reached (all agents logged off).

When an answer is detected 330, the inquiring party is connected to an available agent, step 334, by transferring the voice to the agent's telephone 43a–43c and by transferring any other relevant data pertaining to the called party to the agent's terminal 41a–41c. If no connection is made, the telephone number is scheduled to be called at a later time in a future call campaign, step 336.

Accordingly, the automated telephone call back system of the present invention provides an automatic call back to an inquiring party (e.g., customer or potential customer) in response to a request made by the inquiring party while accessing information over a computer network using a telephone line. The automated dialer system has the capacity to efficiently process the call backs by scheduling the calls as the most convenient time (e.g. immediately or at another time specified by the called party), by automatically dialing, and by pacing the calls so that an agent capable of handling the call will be immediately available when a connection is made. Moreover, if the inquiring party makes the request while connected to a computer network using the only available telephone line, the present invention is capable of contacting the inquiring party as soon as possible after the inquiring party has disconnected and the telephone line becomes available.

Modifications and substitutions by one of ordinary skills in the art are considered to be within the scope of the present invention which is not to be limited except by the claims which follow.

What is claimed is:

1. A system for providing a telephone call back to an inquiring party telephone connected proximate an origin point of a telephone line that is being used to access a computer network, wherein said call back is made based upon a request transmitted over said computer network from a data terminal located at a remote location and connected to said computer network using said telephone line, said call back request including call back data including at least a telephone number of said telephone line, said system comprising:

a computer network interface, connected to said computer network, for interfacing with said computer network and receiving said call back request over said computer network, for identifying said call back data, and for storing said call back data including said telephone number of said telephone line in a call back file; and an automated dialer system, responsive to said call back request received over said computer network, said automated dialer system including:

a call back campaign manager, for retrieving said telephone number of said telephone line stored in said call back file;

a call scheduler for scheduling said telephone number of said telephone line for immediate dialing;

a telephone number dialer for initiating dialing of said telephone number of said telephone line for immediate dialing and for connecting an answered call between said inquiring party telephone and a telephone of an available agent coupled to said automated dialer system; and a re-dial script, responsive to said call back request, said immediate dialing of said telephone number of said call back request, and said detection of said busy signal, for determining that the inquiring party is proximate an origin point of said telephone line and utilizing said telephone line, and for directing said telephone number dialer to immediately and continuously redial said telephone number each time said telephone number dialer detects a busy signal after dialing said telephone number, wherein said origin point of said call back request cannot support voice and data communication simultaneously.

2. The system of claim 1 wherein said telephone number dialer includes a call pacer that paces dialing of said telephone numbers according to a call pacing algorithm.

3. The system of claim 1 wherein said computer network interface interfaces said computer network to agent terminals connected to said automated dialer system.

4. The system of claim 1 wherein said request further includes customer account identifying indicia.

5. The system of claim 1 wherein said call back data further includes a time to call back.

6. The system of claim 5 wherein said call scheduler is responsive to said time to call back, for scheduling dialing of said telephone number at approximately said time to call back.

7. The system of claim 1 wherein said call back data is transmitted over said computer network using a Common Gateway Interface script.

8. The system of claim 1 wherein said call back data is transmitted over said computer network using a JAVA language script.

9. A method for providing a telephone call back to an inquiring party telephone connected to a telephone line that is being used to access a computer network, wherein said call back is made based upon a request transmitted over said computer network from a data terminal located at a remote location and connected to said computer network using said telephone line, said call back request including at least a telephone number of said telephone line, said method comprising the steps of:

receiving said call back request transmitted from said terminal at said remote location, wherein said remote location cannot support voice and data communication simultaneously;

automatically and immediately dialing said telephone number of said call back request over a telephone line using an automated dialer system;

detecting a busy signal;

responsive to said step of receiving said call back request, automatically and immediately dialing said telephone number of said call back request and detecting said busy signal, determining that the inquiring party is proximate an origin point of said telephone line and utilizing said telephone line; and responsive to said step of determining that the inquiring party is proximate said telephone line and utilizing said telephone line, immediately and continuously redialing said telephone number each time said busy signal is detected.

10. The method of claim 9 further including the step of adding said telephone number to a future call campaign, if no connection is made.

11. The method of claim 9 wherein said call back request includes at least one time to be called back, wherein said telephone number is scheduled to be dialed according to said at least one time to be called back.

* * * * *